(12) United States Patent
Cotten et al.

(10) Patent No.: US 6,953,598 B2
(45) Date of Patent: Oct. 11, 2005

(54) DAIRY-BASED CANDY PRODUCTION UTILIZING PLATE AND FRAME ASSEMBLY

(75) Inventors: Gerald B. Cotten, Sparta, NJ (US); Brian C. Hallacker, Hoboken, NJ (US); John M. Cahill, Oak Ridge, NJ (US); Kenneth J. Maas, Pattenburg, NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 282 days.

(21) Appl. No.: 10/032,781

(22) Filed: Dec. 28, 2001

(65) Prior Publication Data

US 2003/0124243 A1 Jul. 3, 2003

(51) Int. Cl.[7] ................................................. A23G 3/32
(52) U.S. Cl. ..................... 426/576; 426/581; 426/583; 426/584; 426/586; 426/587; 426/588; 426/660; 426/523; 426/524
(58) Field of Search ..................... 426/576, 580–588, 426/658–660, 491–492, 510–511, 520–524

(56) References Cited

U.S. PATENT DOCUMENTS

| | | | |
|---|---|---|---|
| 3,607,309 A | * | 9/1971 | Olney et al. ................. 426/571 |
| 3,677,771 A | * | 7/1972 | Kolar .......................... 426/613 |
| 3,825,234 A | | 7/1974 | Ruffinatti |
| 3,989,853 A | | 11/1976 | Forkner |
| 4,056,640 A | | 11/1977 | Otto |
| 4,107,347 A | * | 8/1978 | Burley ........................ 426/660 |
| 4,307,779 A | | 12/1981 | Johansson et al. |
| 4,359,087 A | | 11/1982 | Johansson |
| 4,377,204 A | | 3/1983 | Johansson |
| 4,648,316 A | | 3/1987 | Ruffinatti |
| 4,804,040 A | | 2/1989 | Jan-Ove et al. |
| 4,848,451 A | | 7/1989 | Jonsson et al. |
| 5,236,730 A | | 8/1993 | Yamada et al. |
| 5,298,266 A | | 3/1994 | Mergelsberg et al. |
| 5,384,148 A | * | 1/1995 | Lynch et al. ................. 426/632 |
| 5,462,112 A | | 10/1995 | Johansson |
| 5,607,716 A | | 3/1997 | Doherty et al. |
| 5,766,666 A | | 6/1998 | Streiff et al. |
| 5,864,112 A | | 1/1999 | Blomgren et al. |
| 5,913,361 A | | 6/1999 | Engstrom et al. |
| 5,924,484 A | | 7/1999 | Andersson et al. |
| 5,992,510 A | | 11/1999 | Kallrot |
| 6,099,880 A | | 8/2000 | Klacik et al. |

FOREIGN PATENT DOCUMENTS

| | | | |
|---|---|---|---|
| EP | 753715 A2 | * | 1/1997 |
| EP | 753715 A2 | * | 1/1997 |

OTHER PUBLICATIONS

Justin J. Alikonis, Candy Technology, 1979, AVI Publishing Company Inc, pp. 147–164.*

(Continued)

Primary Examiner—Drew Becker
(74) Attorney, Agent, or Firm—Hollander Law Firm, P.L.C.

(57) ABSTRACT

An efficient method for the continuous production of a dairy-based confection prevents protein burning and precipitation during processing. The method comprises heating an aqueous sugar composition to at least its boiling point in a first heat exchanger, admixing a dairy component with the boiling, aqueous sugar composition after it exits the first heat exchanger to form a dairy-based mass, and cooking the dairy-based mass to a desired final temperature in a second heat exchanger, without substantial separation or precipitation of the protein within the second heat exchanger. The first and second heat exchangers are preferably plate and frame heat exchangers. The solids content of the dairy-based mass is preferably increased prior to entering the second heat exchanger and again after leaving the second heat exchanger. The solids content of the cooked, dairy-based mass is increased to at least about 88% by weight, preferably at least about 90% by weight. An apparatus for practicing the method of the present invention is also disclosed.

36 Claims, 1 Drawing Sheet

OTHER PUBLICATIONS

Justin Alikonis, Candy Technology, 1979, AVI Publishing, pp. 41–42, 57, 147–164.*

Copy of 10.5 oz. Nabisco, Inc. bag package (undated) for LifeSavers® orange & creme Creme Savers® Hard Candy, with copy of US PTO online abstract for U. S. Trademark Registration No. 2,255,941 for the word mark Creme Savers for candy indicating a first use in commerce of Aug. 17, 1998.

Sugar Confectionery Manufacture, second edition, edited by E. B. Jackson, Chapman & Hall, pp. 130–188 (1995).

Alfa Laval Heat Exchanger Operational and Maintenance Manual, Alfa Laval Thermal, Inc., Richmond, VA, undated.

Two page brochure, Alfa Laval Plate Heat Exchanger M10–MFHC, Alfa Laval Thermal, Inc., undated.

"Ultrapasteurized & Pasteurized Food Milk and shell eggs with extended shelf lives," C&EN, Nov. 5, 2001.

* cited by examiner

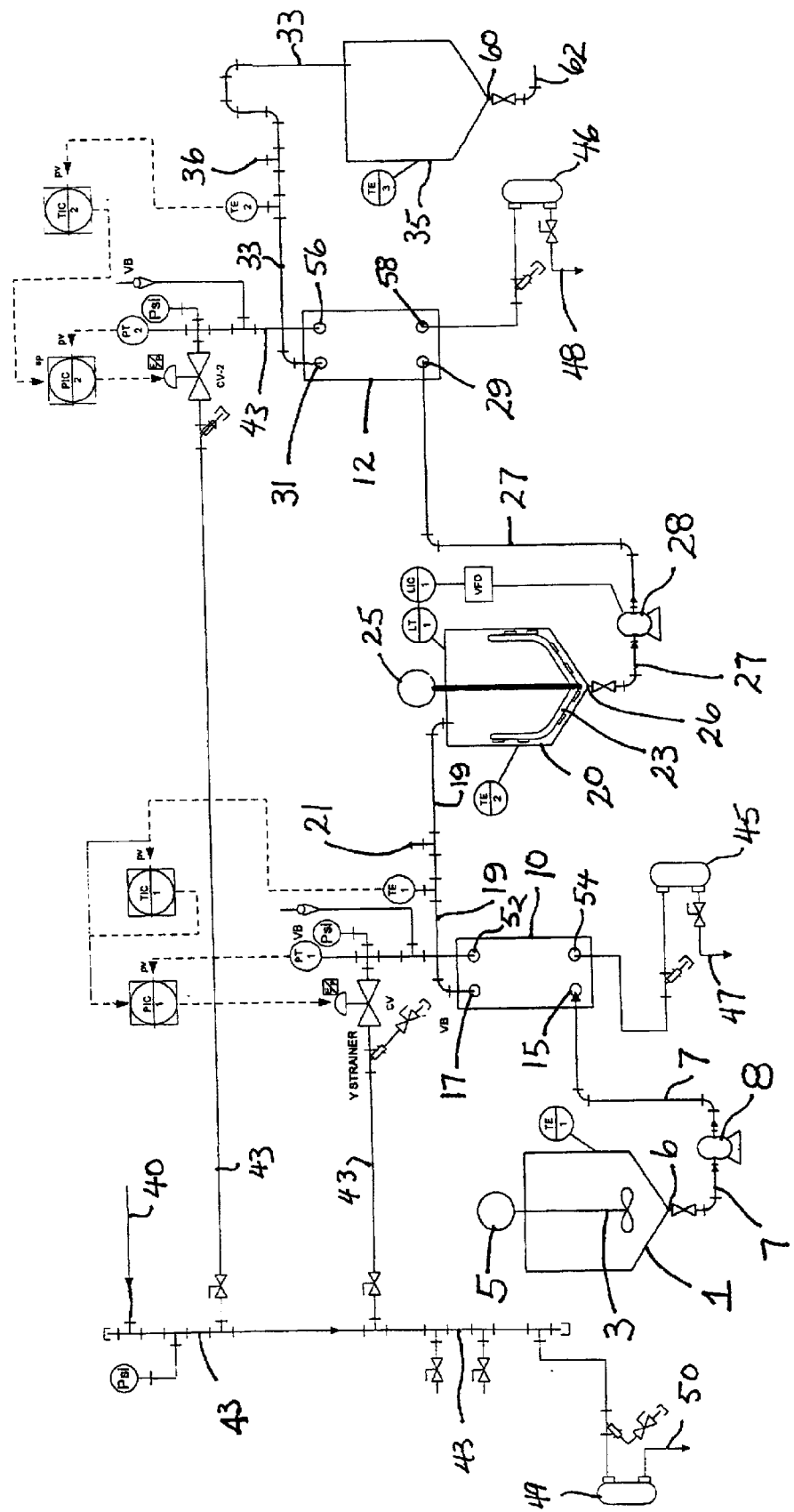

DAIRY-BASED CANDY PRODUCTION UTILIZING PLATE AND FRAME ASSEMBLY

FIELD OF THE INVENTION

The present invention relates to a method for producing a dairy-based confection, such as chewy candies and hard candies, specifically a method which comprises admixing a protein-containing dairy component with a boiling aqueous sugar composition rapidly heating and cooking the thus produced dairy-based mass to its desired cook temperature so as to minimize the Maillard reaction, and finally separating out the cooked off water vapor from the candy mass to achieve a confections product at the desired finished solids concentration. Should a caramelized product be desired, the final cook of the dairy based mass may be delayed by a desired period of time (e.g. about 1 hour) in a scraped surface kettle acting as both a holding kettle and a flash off vessel such that the Maillard reaction may proceed to its desired level. In this event product is allowed to first build in this vessel for the desired period of time (e.g. for about 1 hour) after which it is continuously added and removed (to final cook) at equivalent rates such that the average residence time of the mass in the kettle is the desired delay time (e.g. about 1 hour). The present invention also relates to an apparatus for producing a dairy-based confection wherein the heating elements comprise plate and frame heat exchangers.

BACKGROUND OF THE INVENTION

In the dairy-based confection industry, the trend towards continuous processing has followed two routes, one using high efficiency heat exchangers and the other creating a continuous version of traditional processes using cookers equipped with mechanical scraping means. The latter (mechanical scraping) gained ascendancy in the dairy-based confection industry due to its ability to run continuously without cleaning for prolonged periods of time, such as several days. In the case of high efficiency heat exchangers, the proteins in dairy components tend to precipitate out fairly rapidly and foul heat transfer surfaces thereby necessitating chemical cleaning of the heat exchangers roughly every 6 to 12 hours depending upon protein content of the feed slurry. Regarding dairy cookers, the trends which have attempted to automate cooking processes using them have added more machinery and more moving parts, thereby resulting in increased plant space costs, plant investment costs, machinery maintenance costs and power costs to produce confections. See *Sugar Confectionery Manufacture*, Second Edition, E. B. Jackson Ed., Chapman & Hall, Glasgow, 1995, pp. 176–182.

In the manufacture of confections, it is known to decrease processing time by admitting steam directly into a pre-mixed mass used for making a confection so as to more rapidly heat the same and cook the ingredients to obtain the desired confectionery. As disclosed in U.S. Pat. No. 4,056,640 to Otto, this method allows the artisan to minimize the added water content in the confectionery pre-mix and thereby reduce product cooking times. However, in this method the pre-mix contains dairy or protein components which are heated in a conventional cooker having a plurality of moving parts, including paddles, for mixing the confectionery mass. Accordingly, while direct steam heating and cooking may shorten the actual processing time necessary to make a confectionery product, the numerous moving parts in a conventional cooker require great labor and expense to maintain and clean. In addition, the extended cook times involved in using conventional cookers tend to burn protein components, cause product discoloration via the Maillard reaction which results in caramel off-notes, and foul the cookers with protein precipitates and caking.

Significant reductions in cook time for making a confection have been realized through the use of high efficiency heat exchangers such as wiped film or scraped surface cookers. However, wiped film or scraped surface heat exchangers have numerous moving parts, thereby requiring extensive labor costs for cleaning and maintenance and are considerably more expensive. Moreover, adding elements to create turbulence creates dead spots in heat exchangers, thereby burning the confectionery mass and further complicating the task of cleaning the heat exchanger. As a result, while scraped surface heat exchangers have been utilized for dairy-based confections, their high initial capital investment, and clean up and maintenance costs have limited their wide-spread appeal in dairy-based confection applications.

Regardless of the processing apparatus used, a further problem encountered with temperature sensitive candy masses, such as those containing dairy or protein components, is the burning, denaturing or precipitation of the protein at the beginning of the process or in the beginning of the production line. Such burning and precipitation of protein depends upon the milk composition, the proportion of milk in the total candy mass and the actual temperature level to which the mass is exposed. In an attempt to solve this problem, U.S. Pat. No. 5,298,266 to Mergelsberg et al discloses pre-heating a dairy or protein containing candy stock in a mixing head by direct steam injection prior to feeding the stock into a coiled heat exchanger which contains no moving parts. However, injecting steam into a culinary product requires food grade steam and when it condenses additional energy is needed to remove the added water.

Recently, plate and frame heat exchangers have been proposed as a way of further minimizing the cooked time needed to develop sugar in a heat-sensitive candy mass, such as one containing a dairy component or a protein component. Plate and frame heat exchangers are gaining prominence in the confection industry, most notably commercially via Ruffinatti, replacing coil based cookers for production of non-dairy based confection products, such as chews or high-boiled sweets. They have even been utilized for dairy-based confections but have been limited to six to twelve hour run times because the protein tends to denature, precipitate out and foul the heat transfer surface on the plates, thereby necessitating chemical cleaning wash-outs. This has limited their acceptance for use in dairy-based confection applications due to the short run times in relation to the long, two hour or more, clean-up times. Accordingly, mechanically scraped surface type heat exchangers and cookers remain the most popular mode for dairy-based applications.

The present invention provides a method for making dairy-based or protein containing cooked confections, such as chewy candies or hard candies, while at least substantially or completely avoiding the burning, precipitation and fouling problems associated with heating a confectionery mass in the presence of a dairy component or a protein component. At the same time an efficient process is provided which reduces processing times and saves on energy, maintenance, plant and equipment costs. Flavor development and a whiter product may be achieved without caramel off-notes using a very quick cook and minimal protein exposure to high temperatures in accordance with the method of the present invention. Accordingly, the present inventors have found a continuous process of making a dairy-based or protein containing confection which reduces cooking time, as well as costs associated with maintenance, clean-up and space requirements, and at least substantially or completely avoids protein burning and precipitation problems over prolonged periods of operation, such as at least about 24 hours. In addition, the present invention provides an apparatus for carrying out the method of the present invention which employs static mixing thereby reducing maintenance costs and energy costs for motors, scrapers, and other moving parts. The apparatus also provides a large heat transfer area for cooking thereby permitting the use of lower steam pressures to obtain a given cook temperature.

SUMMARY OF THE INVENTION

The present invention provides a method for producing a dairy-based confection comprising heating an aqueous sugar composition to at least its boiling point to obtain a boiling sugar composition, admixing a protein-containing dairy component with the boiling sugar composition to obtain a dairy-based mass, heating the dairy-based mass to its desired cook temperature for achieving a desired solids content, separating out the cooked off vapor, and cooling the cooked dairy-based mass to obtain a dairy-based confection. By adding the dairy component to an aqueous sugar composition which is at its boiling point, instantaneous vigorous turbulence is created in the boiled aqueous sugar composition due to the aqueous component of the dairy ingredient added. The instantaneous vigorous turbulence prevents burning and precipitation of the protein in the dairy component, thus preventing fouling in the cooking apparatus.

In embodiments of the method according to the present invention, when the dairy component contains water and is injected into the boiling sugar composition, vaporization of the water in the dairy component by steam from the boiling sugar composition and turbulence caused by boiling the sugar composition admixes the dairy component with the boiling sugar composition. Prior to cooking according to the method of present invention, the dairy-based mass may be flashed to remove moisture and increase the solids content of the dairy-based mass.

In cooking according to the method of present invention, the aqueous sugar composition is heated in a counter-current heat exchanger to at least its boiling point, and the dairy-based mass is cooked in a counter-current heat exchanger. Preferably, each of the counter-current heat exchangers is a plate and frame heat exchanger. Injection of the dairy component between the two plate and frame heat exchangers into the boiling sugar-based mass, and then rapidly cooking the resulting dairy-containing mass in the downstream plate and frame heat exchanger to a vigorous, agitated boil prevents substantial precipitation of the protein and fouling of the heat exchanger surfaces. The protein-containing dairy component is thus only admixed with the aqueous sugar composition and subjected to heating in a heat exchanger only when the aqueous sugar composition is at or near its boiling point and is in highly turbulent flow.

After cooking according to the method of the present invention, the solids content of the cooked dairy-based mass may be increased by flashing. Flashing either during or after the final cooking may be accomplished by the application of vacuum to obtain a dairy-based confection with a chewy texture, or to obtain a dairy-based confection with a hard texture. Additional cooking heat exchangers may be applied in series or parallel before the dairy injection or after the dairy injection, however the preference is to use one in each case.

To assist in the development of a viscous confectionery mixture and provide product consistency according to the method of the present invention, gelatin may preferably be admixed with the cooked dairy-based mass before or after increasing the solids content of the cooked dairy-based mass.

According to the method of present invention, the cooked dairy-based mass may be subjected to pulling during cooling to aerate it and to obtain a formable mass and to control color and texture of the cooked product.

According to the method of the present invention, the amount of the dairy component may range from about 3% by weight to about 30% by weight, generally from about 5% by weight to about 28% by weight, for example about 10% by weight, based upon the total weight of the dairy component and aqueous sugar composition. The protein content of the dairy-based confection may range from about 0.4% by weight to about 5% by weight, preferably from about 0.4% by weight to about 3% by weight, based upon the weight of the final dairy-based confection. The dairy component may comprise at least one member selected from the group consisting of milk, cream, sweetened condensed skim milk, sweetened condensed whole milk, condensed milk, anhydrous milk fat, milk solids, whey, butter, yogurt, casein, caseinate salts, protein containing dairy substitutes and cocoa.

According to the method of the present invention, the aqueous sugar composition may include one or more crystallization resistant sugars such as high fructose corn syrup, corn syrup or glucose syrup, dextrose, maltose, lactose, and maltotriose, one or more readily crystallizable sugars such as sucrose, low molecular weight starches or maltodextrins (DE 8 to 38), sugar-free substitutes such as hydrogenated starch hydrolyzates and polydextrose, and sugar substitutes such as sorbitol, xylitol, mannitol, lactitol, maltitol, or palatinit/isomalt (isomaltulose which is a mixture of $\alpha$-D-glucopyranosyl-1,6-mannitol and $\alpha$-D-glucopyranosyl-1,6 sorbitol).

According to the method of the present invention, the aqueous sugar composition may be heated to its boiling initiation point or above, for example from about 222° F. to about 295° F., preferably from about 245° F. to about 280° F. Further, the dairy component may be injected into the boiling aqueous sugar composition at its storage temperature, for example at a temperature of from about 36° F. to about 60° F. Following this injection, the dairy-based mass may be heated above the combined stream's boiling initiation temperature to cook it, for example to a temperature as high as about 295° F., preferably to a temperature of from about 245° F. to about 280° F.

According to the method of the present invention, the aqueous sugar composition may be heated under a pressure of from about atmospheric pressure to about 25 psig. Further according to the method of the present invention, the dairy-based mass may be heated at a pressure of about atmospheric pressure to about 25 psig. The heat transfer medium in each of these cases may preferably be steam operating in the range of about 30 psig to about 70 psig. Still further according to the method of the present invention, the dairy-based mass may be flashed into a vessel vented to atmosphere before and after cooking or to a vessel under vacuum after cooking to further reduce moisture levels. Accordingly, the solids content of the cooked dairy-based mass may be increased under ambient pressure (0 psig) to full vacuum (about 28–30 in. Hg vacuum), preferably about 8 in. Hg vacuum to about 12 in. Hg vacuum, for example about 10 in.

Hg vacuum, depending upon the mode of extraction from the flash-off vessel.

In a preferred embodiment of the present invention, the continuous production of a dairy-based confection comprises heating an aqueous sugar composition to above its initial boiling point in a first plate and frame heat exchanger, admixing a dairy component with the boiling, aqueous sugar composition after it exits the first plate and frame heat exchanger and prior to a flash-off vessel to form a dairy-based mass having a temperature of at least 222° F., preferably 225° F. or greater, separating off the cooked-off water vapor in the flash-off vessel, and then cooking the dairy-based mass in a second plate and frame heat exchanger to its desired final cook temperature to achieve a target solids content for the finished confection without substantial separation or precipitation of the protein within the second plate and frame heat exchanger. According to the preferred method of the present invention, the solids content of the dairy-based mass is increased prior to entering the second heat exchanger by removing moisture from the dairy-based mass. This may be accomplished in a non-agitated flash-off vessel or a mechanically scraped flash-off vessel should caramelization be desired. If the event of the latter, the level of mass in this vessel is allowed to rise under continuous agitation such that an average residence time of mass in the vessel is about 30 minutes to about 1.5 hours, preferably about 1 hour, prior to allowing the mass to proceed forth to the second heat exchanger at a rate consistent with or substantially the same as that at which it is being fed. Further according to the preferred method of the present invention, the solids content of the cooked, dairy-based mass is increased after leaving the second heat exchanger by removing moisture from the cooked, dairy-based mass. The solids content of the final cooked, and moisture-separated dairy-based mass may be from about 88% solids by weight to about 98.5% solids by weight, with about 90% by weight or more, for example as high as about 95% by weight, being employed for a chewy confection.

The present invention also provides an apparatus for the continuous production of a dairy-based confection comprising a heating vessel for dissolving sugars and forming an aqueous sugar composition, and a plurality of serially arranged plate and frame heat exchangers. A first plate and frame heat exchanger is employed for boiling the aqueous sugar composition. The aqueous sugar composition undergoes turbulent flow and is statically mixed and statically agitated within the first exchanger. The first exchanger has an input for receiving the aqueous sugar composition, and an output for removal of boiling aqueous sugar composition. A mixing pipe or conduit connected to the output may be used for transporting the boiling aqueous sugar composition to a second plate and frame heat exchanger. The mixing pipe may have at least one dairy component injection port for continuously receiving at least one dairy component which is continuously mixed through boiling action with the boiling sugar composition as it is transported in the mixing pipe to obtain a dairy-based mass. A second plate and frame heat exchanger receives the dairy-based mass and heats the dairy-based mass to its final cook temperature to achieve the desired % solids content in the finished confection. The dairy-based mass undergoes turbulent flow and is statically mixed and statically agitated within the heat exchanger in conjunction with self-induced mixing due to the boiling action of the dairy-based mass. A vessel connected to the output of the second heat exchanger by a pipe or conduit receives the boiling dairy-based mass and may be used to increase the solids content of the dairy-based mass by removing moisture to obtain a dairy-based confection.

BRIEF DESCRIPTION OF THE DRAWINGS

The sole FIGURE depicts an apparatus for the continuous production of a dairy-based confection according to the present invention.

DETAILED DESCRIPTION OF THE INVENTION

The present invention provides a method and apparatus for making dairy-based or protein containing cooked confections, such as soft caramel, chewy candies, or hard candies. The candies may be produced continuously, for prolonged periods of time, for example for at least about 24 hours, while at least substantially or completely avoiding the burning, precipitation and fouling problems associated with heating and cooking a confectionery mass or sugar composition in the presence of a dairy component or a protein component. The cooking process of the present invention develops no flavor and color off-notes due to its rapid cook without protein precipitation using static mixing and static agitation during turbulent flow of a boiling dairy-based mass through a heat exchanger.

In accordance with the method of the present invention, a dairy-based confection may be produced by forming an aqueous sugar composition by admixing and heating one or more sugars with water to dissolve the sugars and reduce the viscosity of the sugar composition. The aqueous sugar composition may then be subjected to heating to raise its temperature to at least its boiling point to obtain a boiling sugar composition. Then, a protein-containing dairy component may be continuously admixed with the boiling sugar composition to obtain a dairy-based mass. The dairy-based mass may then be heated to obtain a cooked dairy-based mass. The solids content of the cooked dairy-based mass may then be increased by removal of moisture. The cooked dairy-based mass may then be cooled to obtain a dairy-based confection. By adding the dairy component to a boiling aqueous sugar composition, the turbulence created in the boiled aqueous sugar composition and the further heating of the resulting dairy-based mass under turbulent conditions prevent precipitation and burning of the protein in the dairy component, thus preventing fouling in the cooking apparatus.

In the method according to the present invention, a dairy component may contain water and may be injected into the boiling sugar composition. The dairy component is well mixed into the candy mass due to the interaction of its water component with the exiting steam from the boiling sugar composition, resulting in a boiling mixing medium. If no water is present in the injectable dairy component, an in-line mechanical mixer or any type of mixer may be employed to admix the dairy component with the boiling aqueous sugar composition.

According to the method of the present invention, the aqueous sugar composition is heated in a first counter-current heat exchanger and the dairy-based mass is cooked in a second counter-current heat exchanger. Preferably, each of the first and second counter-current heat exchangers is a plate and frame heat exchanger. Alternatively, a coil or a shell and tube heat exchanger may be used so long as a high level of turbulence can be maintained within them. One or more additional cooking heat exchangers may be employed in series or parallel before the dairy injection for heating the aqueous sugar composition. Also, one or more additional cooking heat exchangers may be used after the dairy injection for heating the dairy-based mass. However, the preference is to use one in each case. Generally, if the additional heat exchangers are used in parallel, the mass flow may be split about equally among each of the heat exchangers. Also if the additional heat exchangers are used in series, generally the amount of heating may be split about equally among each of the heat exchangers.

Heating or cooking the dairy-based mass in a plate and frame heat exchanger to a vigorous, agitated boil prevents substantial precipitation of protein and fouling of the heat exchanger surfaces. In addition, the total amount of the heat exchange surface in a plate and frame heat exchanger can be controlled by adding or removing plates. Having fewer plates shortens cook time and allows for better turbulence and helps to prevent two-phase flow where dry spots and burning can develop. A larger number of plates creates a longer cook time, thereby enabling greater sugar development in-process, but can result in an undesirable drop-off in flow velocity, turbulence and pressure in the heat exchanger thereby resulting in burning and precipitation. Generally, about 5 to about 60 plates are used in each of the two plate and frame heat exchangers according to the method of the present invention to achieve outputs of about 200 lbs/hr to about 2000 lbs/hr of finished product.

A preferred plate and frame heat exchanger for use according to the method of the present invention is an Alfa-Laval model M10-BFHC heat exchanger, manufactured by Alfa Laval Thermal, Inc. 5400 International Trade Drive, Richmond, Va., 23231. This heat exchanger is equipped with a frame which includes a fixed frame plate and a moveable pressure plate, an upper carrying bar, a lower guiding bar, and a support column that are removably bolted together so that between the frame plate and the pressure plate there are clamped together a desired number of removable heat exchange plates.

The plates themselves comprise four ports located at the corners, each port being sealed with clip-on gaskets made from EPDM, EPDM-FDA, nitrile-FDA or the like. Each plate is sealed at the edges by the gaskets. The gaskets are so arranged that the two media flow through alternate passages between the plates. The heating medium (e.g. steam) enters one top port and exits out a bottom port located directly below the top port. At the same time, the substrate, such as the dairy based mass, enters the other bottom port and exits out the other top port located directly above the bottom port it entered. The heating medium and the substrate flow through alternate passages between the plates and cannot be mixed. Heat is transferred through the plates, from the hot medium to the cold.

The plates are corrugated which provides a passage between the plates, supports each plate against the adjacent plate, and enhances turbulence, resulting in efficient heat transfer. The plates are reversible and have parallel flow, and therefore only one type of plate is needed. The substrate and the heating medium each follow a corrugated path between two plates, wherein the corrugations enhance turbulence within the fluid flow path. Preferably, the plates have a chevron design pattern and are reversible. The frame plate and a pressure plate may be made of mild steel, and clad with stainless steel in a glass blasted finish. All other parts may be made of stainless steel except the frame nuts which are made of chromium plated brass.

Various kinds of plate and frame heat exchangers may be used in accordance with the method of the present invention. Several useful heat exchangers are described in U.S. Pat. No. 4,804,040 to Jan-Ove et al, U.S. Pat. No. 4,848,451 to Jönsson et al, U.S. Pat. No. 4,377,204 to Johansson, and U.S. Pat. No. 4,359,087 to Johansson. The entirety of each of U.S. Pat. Nos. 4,804,040, 4,848,451, 4,377,204, and 4,359,087 is hereby incorporated herein by reference.

According to the method of the present invention, increasing solids content may preferably comprise flashing. For example, prior to cooking the dairy-based mass according to the method of present invention, the dairy-based mass comprising the boiling aqueous sugar solution may be flashed to remove moisture and vapor and increase the solids content of the dairy-based mass. Flashing, or pressure reduction to remove moisture, prevents two phase flow which can cause dry spots and burning in cooker apparati. More specifically, flashing allows for better control in the second counter-current heat exchanger because the excess evaporated moisture (steam) is drawn off in a flash-off chamber to enable a more steady feed rate of product being fed into the second counter-current heat exchanger. Additionally, by removing the excess vapor, the likelihood of creating "dry plates" in the second counter-current heat exchanger is minimized. Dry plates occur when there is two phase flow (vapor/liquid) or pulsation of liquid in which the vapor volume is too large and preferentially flows up certain channels thereby resulting in dry areas in which burn on can occur. Flashing also helps to prevent cavitation in any pumps which may optionally be employed for transferring the dairy-based mass to the second heat exchanger. Flashing to remove moisture from the dairy-based mass prior to the second heat exchanger and increase its solids content is preferentially accomplished by flashing at atmospheric pressure. In embodiments of the present invention, the flashing may increase the solids content of the dairy-based mass to obtain a solids content of from about 75% solids by weight, preferably from about 80% solids by weight, to about 90% solids by weight, for example from about 81% solids by weight to about 87% solids by weight. In the event a caramelized end product is desired, this first flash-off vessel can double as a caramelizing kettle by installing a scrapped surface type agitator and having sufficient tank size to permit product passing through continuously to have about 30 minutes to about 1.5 hours, preferably about 1 hour residence time by allowing the tank to fill up first to a set level before commencing continuous removal to the second heat exchanger.

After increasing the solids content of the dairy-based mass according to the method of the present invention, the dairy-based mass is fed through a pump which meters the dairy-based mass into a second heat exchanger in a controlled fashion so that the heat exchanger can accurately control the product output temperature to within ±2° F.

In embodiments of the present invention, the dairy-based candy mass stream is at or near its boiling point upon entering the second counter-current heat exchanger, whereby a high rate of turbulence created by the plates in conjunction with the immediate onset of boiling is enough to keep the protein-containing dairy components emulsified such that run times in excess of 24 hours can be achieved. Further, the turbulence of the boiling activity serves to prevent protein burning and precipitation. Longer run times mean less down time for the confectionery plant, and reduced cleaning costs as well. Accordingly, in the preferred method of the present invention, the temperature of the dairy-based mass is maintained above its boiling point at every point in the second heat exchanger.

In embodiments of the present invention, the temperature of the dairy-based mass may fall below, but still near, its boiling point as a result of flashing and/or as a result of heat loss during transport downstream of the flash-off chamber.

For example, the dairy-based mass temperature may be up to about 5° F., or even up to about 10° F. below the boiling point of the dairy-based mass. The temperature of the dairy-based mass may be rapidly raised again to its boiling point or higher upon entering the second heat exchanger by, for example increasing steam temperatures fed to the heat exchanger. However, generally it is preferred to heat the aqueous sugar composition in the first heat exchanger to a temperature higher than its onset boiling point, for example from about 10° F. to about 70° F. higher, preferably from about 25° F. to about 55° F. higher than its boiling initiation point. The elevated temperatures compensate for temperature reduction caused by injection of a cooler dairy component or caused by the evaporative cooling effect accompanying flashing. Use of the elevated temperature for the aqueous sugar composition helps to assure that a desired dairy-based mass temperature which is at or above its boiling point is achieved upon entry to the second heat exchanger. Generally, it is preferred to heat the dairy-based mass in the second heat exchanger to a final temperature whereby the desired solids content of the confection or candy is achieved, generally in the range of about 250° F. to about 295° F. Generally, the aqueous sugar composition and the dairy based mass each have a given solids content and each have an initial or onset boiling point at a given pressure (preferably atmospheric pressure) upon entering the first and second heat exchangers, respectively. However, as each composition is heated at its initial boiling point, water vapor is formed, the solids content of the remaining boiling liquid phase increases, and therefor the boiling point at the given pressure (preferably atmospheric) of each composition increases above the initial boiling point or onset boiling point.

After cooking, the solids content of the cooked dairy-based mass is increased to obtain a cooked dairy-based mass with a chewy texture. The solids content of the cooked dairy-based mass may preferably be increased by flashing. This flashing step may be accomplished either atmospherically or under vacuum to achieve higher solids contents at lower final cook temperatures. Flashing after cooking to remove moisture and increase the solids content of the cooked dairy-based mass may be accomplished by flashing to about atmospheric pressure or by pressure reduction by the application of vacuum to obtain pressures of from about 0 psig down to about full vacuum (about 28–30 in. Hg vacuum), generally from about 12 in. Hg vacuum to about atmospheric pressure. In preferred embodiments a vacuum of about 8 in. Hg vacuum to about 12 in. Hg vacuum, for example about 10 in. Hg vacuum may be employed.

The hardness of the candy produced according to the method of the present invention depends on the final moisture content of the candy. Generally, solids contents for confections may range from about 88% to about 98.5%. For soft caramels, the desired solids content ranges from about 88% to about 92%. For chewy candy, the desired solids content lies at about 90% or more, for example, as high as about 95% for harder chewy candies. Hard candy, such as toffee and Creme Savers®, generally has a solids content of from about 97% to about 98.5%.

According to the method of the present invention, the cooked dairy-based mass may be subjected to pulling during cooling. The pulling helps to aerate the candy, whiten it, and develop a desirable consistency and texture. Pulling may be practiced according to methods known to those of ordinary skill in the art.

According to the method of present invention, the cooked dairy-based mass is cooled to produce a dairy-based confection. Cooling may be practiced according to methods known to those of ordinary skill in the art, including cooling on a pan or table at room temperature. The cooled, cooked, dairy-based mass may be formed into pieces using conventional methods such as molding, extrusion and cutting.

As for proportions, according to the method of the present invention, the amount of the dairy component fed may range from about 3% by weight to about 30% by weight, generally from about 5% by weight to about 28% by weight, for example about 10% by weight, based upon the total weight of the dairy component and aqueous sugar composition. The protein content of the dairy-based confection may range from about 0.4% by weight to about 5% by weight, based upon the weight of the final dairy-based confection. If too high an amount of dairy component or protein content is used, it may result in a product having a tough, rubbery texture or may cause discoloration owing to processing difficulties with the protein itself. Too low an amount of dairy component or protein will result in a product that lacks a dairy flavor and which lacks body or resistance to cold flow. Further, any desired Maillard browning, which is optional and gives caramel and toffee part of its distinctive flavor and color, will not occur in a product that has too low an amount of a dairy component or protein.

The dairy component according to the method of the present invention may comprise at least one of milk, cream, sweetened condensed skim milk, sweetened condensed whole milk, condensed milk, anhydrous milk fat, milk solids, whey, butter, yogurt, casein, caseinate salts, protein containing dairy substitutes and cocoa. Dairy substitutes may include soy protein, soy milk, and coconut milk. Cocoa is defined as a mixture of milk or milk solids and cocoa. Preferable dairy components are condensed milk, sweetened condensed skim milk and sweetened condensed whole milk. If a dry dairy component is used, it is preferred to suspend or dissolve it in water to prevent grittiness in the final product. Lactose components are preferably pre-crystallized to ensure uniform small crystals which will not cause grittiness in the final product. Dairy component solids may be suspended or dissolved in water using an in-line or static mixer located upstream of a dairy injection port. If solid dairy or protein components are used, they may be suspended or dissolved in water in the amount of about 1 part by weight of dairy or protein solids to about 2 to about 10 parts by weight of water. The term "weight of a protein-containing dairy component" includes the suspending water used to suspend solid dairy or protein components.

Sugars which may be employed in the present invention are one or more crystallization resistant sugars, such as 42 DE 43 Baumé corn syrup, wheat or high maltose corn syrup, and readily crystallizable sugars, such as sucrose. Exemplary sugar solutions and syrups that may be used include corn syrup, especially low DE corn syrup and high maltose corn syrup, wheat syrups, low molecular weight starches or maltodextrins (DE 8–38), and sugar-free substitutes like hydrogenated starch hydrolyzates and polydextrose, mixtures containing a corn syrup or a high fructose corn syrup mixed with at least one of an aqueous sucrose composition, aqueous cane sugar composition, dextrose, maltose, lactose, maltitriose, sugar substitutes such as sorbitol, xylitol, mannitol, lactitol, maltitol, or palatinit/isomalts, (isomaltulose which is a mixture of α-D-glucopyranosyl-1,6-mannitol and α-D-glucopyranosyl-1,6 sorbitol), molasses, honey, or galactose, and mixtures thereof. According to the method of the present invention, the aqueous sugar composition preferably comprises a 42-43 Baumé corn syrup, wheat syrup or high maltose corn syrup, with the latter being especially preferred for hard candies. To prevent graining in the product if crystallizing sugars such as sucrose are used, generally they should not be used in amounts of greater than about 1.1 parts by weight per part of non-crystallizing sugars, such as corn syrups (42 DE 43 Baumé), high maltose corn syrup, and high fructose corn syrup. Maltodextrin and dextrose syrups may be added in amounts of about 1% by weight to about 5% by weight of the total amount of sugar used to assist in reducing caramelization and sweetness, while increasing viscosity. Fructose and high fructose corn syrups may be added in amounts of about 1% by weight to about 5% by weight of the total amount of sugar used to assist in increasing caramelization and sweetness. The total amount of water or moisture contained in any aqueous sugar composition should generally not exceed about 32% by weight, preferably 22% by weight, based on the weight of the total aqueous sugar composition.

According to the method of the present invention, the proportion of aqueous sugar composition, based on the total weight of the aqueous sugar composition and the protein containing dairy component, may range from about 70% by weight to about 97% by weight, generally from about 72% by weight to about 95% by weight. Preferably, about 12 to 3 parts by weight of a boiling aqueous sugar composition is mixed with about 1 part by weight of a protein containing dairy component.

To assist in the development of a viscous confectionery mixture and provide product consistency according to the method of the present invention, gelatin or starch may be admixed with the cooked dairy-based mass before or after increasing the solids content of the cooked dairy-based mass. Generally, gelatin or starch may be added in the amount of about 0.1%, by weight, to about 5%, by weight, based on the total weight of the cooked dairy-based mass. Gelatin is preferably added as a concentrated hydrated, aqueous suspension made in a separate system located upstream of a gelatin injection port.

Prior to cooling the cooked dairy-based mass or while it is still fluid or plastic during cooling, one or more additives, such as flavorants, acidulents, and colorants, may be added to the cooked dairy-based mass while stirring or shearing the mass either mechanically or by static means. Such additives may be added as liquids or solids, such as powders. Solid additives may be dissolved or dispersed in water or a small quantity of syrup, e.g. high fructose corn syrup, prior to addition to the cooked dairy-based mass. Colorants, acidulents, and flavorants may each be added in conventional amounts, such as from about 0.01% by weight to about 1.0%, by weight, based on the total weight of the cooked dairy-based mass.

Utilizing a candy formula which incorporates surfactants, such as lecithin, mono- and di-glycerides (about 1% by weight to about 3% by weight), and glycerol monostearate (GMS), may help keep the proteins properly emulsified and aid in preventing burning or caking. Emulsifiers are preferably added as a part of the dairy component and may generally be used in the amount of about 0.1%, by weight, to about 1%, by weight, based on the total weight of the dairy component and aqueous sugar composition.

Generally, aqueous sugar compositions having a total solids content of at least about 70% by weight, preferably about 75% by weight and above, have a boiling point at atmospheric pressure of at least about 222° F., preferably about 225° F. and above, with the boiling point increasing as the total solids content increases. In accordance with embodiments of the present invention, the aqueous sugar composition may be heated to boil at atmospheric pressure at a temperature of from about 225° F. to about 295° F., preferably about 245° F. to about 280° F. Below about 225° F., an aqueous sugar composition with at least about 75% by weight solids will not boil at atmospheric pressure. At above about 225° F. and atmospheric pressure, the boiling of the aqueous sugar composition is sufficiently vigorous to suspend dairy component that is injected therein, depending upon the ratio of dairy to non-dairy slurry feed. The resulting dairy-based slurry temperature should generally be at 225° F. or above to ensure the mass is at or near its equilibrium or atmospheric boiling point. Caramelization generally takes place at from about 230° F. to about 240° F. without any undesirable discoloration, or off-flavor development. Above about 240° F., the protein-containing dairy component admixed with the aqueous sugar composition may tend to brown too fast, which can cause off-flavors and discoloration, however it may be substantially avoided by the use shorter heating times, on the order of a minute or less.

The protein-containing dairy component is stored at a temperature range of from about 36° F. to about 60° F. to maintain freshness. Likewise, the dairy component is injected into the boiling aqueous sugar composition at a dairy component temperature of from about 36° F. to about 60° F. Following this injection, the dairy-based mass may be heated above its boiling temperature to cook it, for example to a temperature as high as about 295° F., preferably to a temperature of from about 245° F. to about 280° F.

According to the method of the present invention, the aqueous sugar composition may be heated under a pressure of from about atmospheric pressure to about 25 psig in the first heat exchanger. The dairy-based mass may be heated at a pressure of about atmospheric pressure to about 25 psig in the second heat exchanger. The residence time of the media being heated in each heat exchanger may generally be less than about one minute, preferably about 0.5 minute or less, for example from about 10 seconds to about 30 seconds. Typical steam pressures employed in the heat exchangers or cookers may range from about 30 psig to about 70 psig, depending on the desired finished solids content or cook temperatures, and number of plates utilized.

In a preferred embodiment of the method according to the method of present invention, the continuous production of a dairy-based confection comprises heating an aqueous sugar composition to at least its boiling point in a first plate and frame heat exchanger, admixing a dairy component with the boiling, aqueous sugar composition after it exits the first plate and frame heat exchanger to form a dairy-based mass having a temperature greater than about 225° F., and heating the dairy-based mass in a second plate and frame heat exchanger to its final desired cook temperature to achieve a desired final solids content of the dairy-based mass without substantial separation or precipitation of the protein within the second plate and frame heat exchanger. According to the preferred method of present invention, the solids content of the dairy-based mass is increased prior to entering the second heat exchanger. Further according to the preferred method of present invention, the solids content of the cooked, dairy-based mass is increased after leaving the second heat exchanger via a flash-off vessel. Therefore, according to the preferred method of the present invention, the solids content of the cooked, dairy-based mass is increased to at least about from 88% by weight to about 98.5% by weight, preferably about 90% by weight.

The present invention also provides an apparatus for the continuous production of a dairy-based confection comprising a heating vessel for dissolving sugars and forming an aqueous sugar composition, and a first plate and frame heat exchanger for receiving and boiling the aqueous sugar composition. The first exchanger comprises an input for receiving the aqueous sugar composition, and an output for removal of boiling aqueous sugar composition. A mixing pipe may be employed for transporting the boiling aqueous sugar composition to a second plate and frame heat exchanger. The mixing pipe may have a dairy component injection port for receiving a dairy component which is mixed with the boiling sugar composition in the mixing pipe to obtain a dairy-based mass. The second plate and frame heat exchanger receives the dairy-based mass at its input end and heats the dairy-based mass above its boiling point and cooks the dairy-based mass to its desired cook temperature to achieve the desired solids content after flashing off the vapor. A vessel is connected to the output of the second heat exchanger via a pipe or conduit for receiving boiling dairy-based mass and for increasing the solids content of the dairy-based mass to obtain a dairy-based confection. An injection port may be provided in the connecting pipe for injection of gelatin and optional additives such as flavorants and coloring agents from a conventional additive storage vessel.

The sole FIGURE depicts a preferred embodiment of an apparatus for the practice of the present invention. An aqueous sugar solution is formed as a pre-mix in a slurry feed tank 1 that is equipped with a mixer 3 driven by motor 5 to aid in the dissolution of sugar solids in the solution that will be brought to a boil in a first plate and frame heat exchanger 10. The feed tank 1 may be steam jacketed to preheat the aqueous sugar composition to a temperature below its boiling point, generally about 155° F. to about 190° F., for example about 170° F. The preheated aqueous sugar composition exits the feed tank 1 from outlet 6 for conveyance via conduit 7 and pump 8 to the product inlet 15 of heat exchanger 10. Pump 8 located downstream of slurry feed tank 1 and upstream of the heat exchanger 10 insures control of consistent product flow into the first heat exchanger 10.

The dairy based confections are produced utilizing a series of two plate and frame heat exchangers, 10 and 12. Each heat exchanger 10 and 12 may be an Alfa-Laval model M10-BFHC heat exchanger, manufactured by Alfa Laval Thermal, Inc. The boiling aqueous sugar composition exits from heat exchanger 10 via product outlet 17 and is conveyed by mixing pipe or conduit 19 to a caramelizing and flashing tank 20. A protein containing dairy component is injected into the mixing pipe 19 through dairy injection port 21 into the boiling candy mass containing the vaporized water exiting heat exchanger 10. The dairy component may be fed from a conventional dairy storage vessel (not shown) into the injection port. In the mixing pipe 19 the dairy component is well mixed into the boiling aqueous sugar composition to obtain a dairy-based mass due to the interaction or vaporization of the water component contained in the dairy component with the exiting steam from the heat exchanger 10 which results in a boiling mixing medium in mixing pipe 19. The resulting dairy-based candy mass is at or near its boiling point and, therefore, well mixed. If no water was present in the injectable dairy component, an in-line mechanical or other type of mixer could be employed to achieve mixing into an at least substantially homogeneous mixture.

Preferably, after the dairy-based candy mass exits the first heat exchanger 10 excess evaporated moisture (steam) is drawn off in flash-off chamber 20 equipped with an agitator 23 (if the possibility of caramelization is desired) which is driven by mixer motor 25 to insure that burn-on in the vessel 20 does not occur. Flash-off chamber 20 may be an open-topped vessel for flashing and vapor removal at atmospheric pressure. Additionally, by removing the excess vapor, the likelihood of creating "dry plates" in the second heat exchanger 12 is minimized. The flashed, dairy-based mass may be removed from the flash chamber 20 via bottom outlet 26 and conveyed via conduit or pipe 27 to the second heat exchanger 12 for heating and cooking. A pump 28 may be located downstream of flash-off tank 20 and upstream of the second heat exchanger 12 to insure rate control of product flow into the second heat exchanger 12.

The dairy-based candy mass stream is at or near its boiling point upon entering the second heat exchanger 12 through its product inlet 29, whereby a high rate of turbulence created by the heat exchanger plates in conjunction with the immediate onset of boiling is sufficient to keep the protein-containing dairy components emulsified such that run times in excess of 24 hours can be achieved.

After cooking, the cooked dairy-based candy mass exits the second heat exchanger 12 from product outlet 31 and is passed via conduit 33 into a holding tank 35 to separate the steam from the cooked dairy-based mass. The holding tank 35 may be open to the atmosphere for flashing and moisture removal at atmospheric pressure. In other embodiments, the holding tank 35 may be equipped with a vacuum chamber to separate the steam from the cooked dairy-based mass. Generally, higher vacuums are employed when higher solids content candies are desired. The holding tank 35 may be optionally equipped with a motor driven stirrer (not shown) for stirring water-based flavors or other additives optionally added into the holding tank for obtaining an at least substantially homogeneous candy mass.

An ingredient injection port 36 may be located downstream of the second heat exchanger 12 in conduit 33 so that gelatin and/or other additives can be added to the cooked candy mass, thereby taking advantage of the two-phase flow to vaporize a portion of the liquid so added and permit ensuing boiling action to provide homogeneous mixing of the additives with the cooked candy mass. The gelatin or other additives may be supplied from conventional ingredient storage tanks. They may be injected together via one injection port 36 or separately through a plurality of injection ports.

Typical steam pressures employed via the cookers 10 and 12 may range between about 30 psig and about 70 psig, depending on the desired finished solids content and number of plates utilized. Steam may be injected into heat exchanger cookers 10 and 12 from steam supply 40 through a network 43 of steam supply lines equipped with control valves. Steam from the heat exchangers 10 and 12 may be condensed and returned to steam supply 40 via steam traps 45, 46 and condensate returns 47, 48 located adjacent each heat exchanger 10 and 12, respectively. Another steam trap 49 and condensate return 50 is located at the upstream end of steam supply line network 23. Steam enters top steam inlet 52 and condensate exits bottom steam outlet 54 of the first heat exchanger 10 for counter-current flow with respect to the aqueous sugar composition which enters bottom product inlet 15 and exits top product outlet 17. Similarly, steam enters top steam inlet 56 and condensate exits bottom steam outlet 58 of the second heat exchanger 12 for counter-current flow with respect to the dairy-based candy mass which enters bottom product inlet 29 and exits top product outlet 31.

The cooked dairy-based mass may exit from the bottom outlet 60 of the holding tank 35 and transferred via conduit 62 to a conventional candy pulling device or machine (not shown) for pulling and cooling the dairy-based mass into a dairy-based confection. The cooled, cooked, dairy-based mass may be formed into pieces using candy forming equipment such as molds, extruders, and cutting devices (not shown).

What is claimed is:

1. A method for the continuous production of a dairy-based confection comprising:
   a) heating an aqueous sugar composition to at least the boiling point in a first heat exchanger to obtain a boiling sugar composition,
   b) admixing a protein-containing dairy component with the boiling sugar composition to obtain a dairy-based mass,
   c) heating the dairy-based mass above the initial boiling point in a second heat exchanger, cooking the dairy-based mass, and obtaining a cooked dairy-based mass,
   d) increasing the solids content of the cooked dairy-based mass, and
   e) cooling the cooked dairy-based mass to obtain a dairy-based confection,
   wherein the first and second heat exchangers are selected from the group consisting of a plate and frame heat exchanger, a shell and tube heat exchanger, and a coil heat exchanger, and said protein-containing dairy component is injected between said first and second heat exchangers.

2. A method as claimed in claim 1 wherein:
   said dairy component contains water and is injected into said boiling sugar composition, and
   vaporization of the water by steam from said boiling sugar composition admixes the dairy component with the boiling sugar composition.

3. A method as claimed in claim 1 wherein the dairy-based mass is flashed to remove moisture and increase the solids content of the dairy-based mass prior to said cooking.

4. A method as claimed in claim 1 wherein the aqueous sugar composition is heated in a counter-current heat exchanger and the dairy-based mass is cooked in a counter-current heat exchanger.

5. A method as claimed in claim 4 wherein the counter-current heat exchangers are plate and frame heat exchangers.

6. A method as claimed in claim 1 wherein the dairy-based mass is heated in a plate and frame heat exchanger to a vigorous, agitated boil so as to prevent substantial precipitation of protein and fouling of the heat exchanger surfaces.

7. A method as claimed in claim 1 wherein the solids content of the cooked dairy-based mass is increased by flashing.

8. A method as claimed in claim 1 wherein the solids content of the cooked dairy-based mass is increased by the application of vacuum.

9. A method as claimed in claim 1 wherein the solids content of the cooked dairy-based mass is increased to obtain a dairy-based confection with a chewy texture.

10. A method as claimed in claim 1 wherein gelatin is admixed with the cooked dairy-based mass before increasing the solids content of the cooked dairy-based mass.

11. A method as claimed in claim 1 wherein the cooked dairy-based mass is subjected to pulling during cooling.

12. A method as claimed in claim 1 wherein the amount of said dairy component is from about 3% by weight to about 30% by weight, based upon the total weight of the dairy component and aqueous sugar composition.

13. A method as claimed in claim 1 wherein the protein content of the dairy-based confection is from about 0.4% by weight to about 5% by weight, based upon the weight of the dairy-based confection.

14. A method as claimed in claim 1 wherein said dairy component comprises at least one member selected from the group consisting of milk, cream, sweetened condensed skim milk, sweetened condensed whole milk, condensed milk, anhydrous milk fat, milk solids, whey, butter, yogurt, casein, caseinate salts, protein containing dairy substitutes, and a mixture of milk or milk solids and cocoa.

15. A method as claimed in claim 1 wherein said aqueous sugar composition is heated to a temperature of from about 225° F. to about 295° F.

16. A method as claimed in claim 15 wherein said dairy component is injected at a temperature of from about 36° F. to about 60° F.

17. A method as claimed in claim 1 wherein said dairy-based mass is heated to a temperature of from about 245° F. to about 295° F.

18. A method as claimed in claim 1 wherein said aqueous sugar composition comprises a mixture of sucrose with at least one syrup selected from the group consisting of corn syrup and wheat syrup.

19. A method as claimed in claim 1 wherein said aqueous sugar composition is heated at a pressure of from about atmospheric pressure to about 25 psig.

20. A method as claimed in claim 1 wherein said dairy-based mass is heated at a pressure of about atmospheric pressure to about 25 psig.

21. A method as claimed in claim 3 wherein the dairy-based mass is flashed at a pressure of about atmospheric pressure.

22. A method as claimed in claim 21 wherein the solids content of the cooked dairy-based mass is increased at a pressure of about atmospheric to about 28 in. Hg vacuum.

23. A method according to claim 1, wherein the aqueous sugar composition is statically mixed within the first heat exchanger and the dairy-based mass is statically mixed within the second heat exchanger.

24. A method for the continuous production of a dairy-based confection comprising:
   heating an aqueous sugar composition to at least the boiling point in a first plate and frame heat exchanger,
   admixing a dairy component with the boiling, aqueous sugar composition after the boiling, aqueous sugar composition exits the first plate and frame heat exchanger to form a dairy-based mass,
   heating the dairy-based mass above the initial boiling point in a second plate and frame heat exchanger to a final temperature to achieve a desired solids content after vapor separation, and
   cooking said dairy-based mass in said second plate and frame heat exchanger without substantial separation or precipitation of the protein within the second plate and frame heat exchanger.

25. A method as claimed in claim 24 wherein the solids content of said dairy-based mass is increased prior to entering said second heat exchanger.

26. A method as claimed in claim 25 wherein the solids content of the cooked, dairy-based mass is increased after leaving said second heat exchanger.

27. A method as claimed in claim 26 wherein the solids content of the cooked, dairy-based mass is increased to at least about 90% by weight.

28. A method according to claim 24, further comprising flashing off excess steam in a flash-off chamber prior to heating the dairy-based mass in the second plate and frame heat exchanger.

29. A method for the continuous production of a dairy-based confection, comprising:

dissolving sugars in a heating vessel or feed tank to form an aqueous sugar solution, transferring the aqueous sugar solution to a first plate and frame heat exchanger, heating the aqueous sugar composition to at least the boiling point in the first plate and frame heat exchanger, admixing a dairy component with the boiling, aqueous sugar composition under turbulent flow after the boiling, aqueous sugar composition exits the first plate and frame heat exchanger to form a dairy-based mass, and cooking said dairy-based mass above the initial boiling point in a second plate and frame heat exchanger under turbulent conditions without substantial separation or precipitation of the protein within the second plate and frame heat exchanger.

30. A method according to claim 29, wherein the sugars are preheated in the heating vessel or feed tank to a temperature below the boiling point.

31. A method according to claim 29, wherein the dairy component is injected into the boiling sugar composition containing steam.

32. A method according to claim 29, wherein the admixing of the dairy component with the boiling, aqueous sugar composition creates turbulence in the boiling, aqueous sugar composition and the cooking of the dairy-based mass under turbulent conditions prevents precipitation and burning of the protein in the dairy component, thus preventing fouling in the second plate and frame heat exchanger.

33. A method according to claim 29, further comprising flashing off excess steam in a flash-off chamber prior to heating the dairy-based mass in the second plate and frame heat exchanger.

34. A method for the continuous production of a dairy-based confection, comprising:

heating an aqueous sugar composition to at least the boiling point in a first heat exchanger to obtain a boiling sugar composition, transporting the boiling sugar composition from the first heat exchanger via a mixing pipe having an injection port, injecting a dairy component into the injection port, thereby mixing the dairy component with the boiling sugar composition in the mixing pipe to obtain a dairy-based mass, flashing off excess steam in a flash-off chamber thereby increasing the solids content of the dairy-based mass, transporting the dairy-based mass from the flash-off chamber to a second heat exchanger, heating the dairy-based mass to above the initial boiling point in the second heat exchanger, cooking the dairy-based mass to obtain a cooked dairy-based mass, and cooling the cooked dairy-based mass to obtain a dairy-bad confection.

35. A method according to claim 34, wherein the first and the second heat exchangers are plate and frame heat exchangers.

36. A method according to claim 34, wherein an in-line mixer admixes the injected dairy component with the boiling sugar composition.

* * * * *